(12) United States Patent
An

(10) Patent No.: US 11,270,094 B2
(45) Date of Patent: Mar. 8, 2022

(54) TOUCH PANELS AND DRIVING CONTROL METHODS THEREOF, TOUCH DISPLAY DEVICES

(71) Applicant: Yungu (Gu'an) Technology Co., Ltd., Langfang (CN)

(72) Inventor: Lei An, Jiangsu (CN)

(73) Assignee: Yungu (Gu'an) Technology Co., Ltd., Hebei (CN)

(*) Notice: Subject to any disclaimer, the term of this patent is extended or adjusted under 35 U.S.C. 154(b) by 0 days.

(21) Appl. No.: 16/913,409

(22) Filed: Jun. 26, 2020

(65) Prior Publication Data

US 2020/0327297 A1  Oct. 15, 2020

Related U.S. Application Data

(63) Continuation-in-part of application No. PCT/CN2018/096964, filed on Jul. 25, 2018.

(30) Foreign Application Priority Data

Dec. 29, 2017 (CN) .......................... 201711481123.1

(51) Int. Cl.
*G06K 9/00* (2006.01)
*G06F 3/041* (2006.01)
*G06F 3/044* (2006.01)

(52) U.S. Cl.
CPC .......... *G06K 9/0004* (2013.01); *G06F 3/0412* (2013.01); *G06F 3/0446* (2019.05); *G06F 3/04164* (2019.05); *G06F 3/04166* (2019.05); *G06K 9/0002* (2013.01)

(58) Field of Classification Search
CPC ....... G06F 3/044–0448; G06K 9/00006–0012; G06K 2009/0006
See application file for complete search history.

(56) References Cited

U.S. PATENT DOCUMENTS

| | | | | |
|---|---|---|---|---|
| 8,564,314 B2* | 10/2013 | Shaikh | ................ | G06K 9/0002 324/686 |
| 9,329,742 B2* | 5/2016 | Yi | ......................... | G06F 3/0448 |
| 9,940,500 B2* | 4/2018 | Liu | ....................... | G06F 3/0443 |
| 9,952,687 B2* | 4/2018 | Jiang | ....................... | G06F 21/32 |
| 10,002,278 B2* | 6/2018 | Song | ....................... | G06F 21/32 |
| 10,083,336 B2* | 9/2018 | Han | ..................... | G06F 3/0446 |
| 10,095,349 B2* | 10/2018 | Han | .................... | G06F 3/04164 |
| 10,216,971 B2* | 2/2019 | Cho | ..................... | G06F 3/0443 |
| 10,268,863 B2* | 4/2019 | Chan | ..................... | G06F 3/0445 |

(Continued)

FOREIGN PATENT DOCUMENTS

| | | |
|---|---|---|
| CN | 103530609 A | 1/2014 |
| CN | 104063094 A | 9/2014 |

(Continued)

*Primary Examiner* — Patrick F Marinelli
(74) *Attorney, Agent, or Firm* — BakerHostetler

(57) ABSTRACT

The disclosure is provided with a touch panel and driving control method thereof, and a touch display device. The touch panel includes: a first electrode, a second electrode, and a third electrode. The first electrode, the second electrode, and the third electrode are insulated from each other. The first electrode and the second electrode are crosswise arranged to form a touch film layer, and the second electrode and the third electrode are crosswise arranged to form a fingerprint identification film layer.

9 Claims, 5 Drawing Sheets

(56) References Cited

U.S. PATENT DOCUMENTS

| | | | | |
|---|---|---|---|---|
| 10,338,731 B2* | 7/2019 | Song | | G06K 9/0002 |
| 10,379,684 B2* | 8/2019 | Ahn | | G06K 9/0002 |
| 10,467,449 B2* | 11/2019 | Jang | | G06F 3/0446 |
| 10,481,741 B2* | 11/2019 | Han | | G06K 9/0002 |
| 10,579,175 B2* | 3/2020 | Seol | | G06F 3/0412 |
| 10,613,677 B2* | 4/2020 | Cho | | G06F 3/0445 |
| 10,627,938 B2* | 4/2020 | Lee | | G06F 3/04164 |
| 10,627,955 B2* | 4/2020 | Ko | | H01L 27/323 |
| 10,691,231 B2* | 6/2020 | Han | | G06F 3/041 |
| 10,705,663 B2* | 7/2020 | Ahn | | G06F 3/0446 |
| 10,839,187 B2* | 11/2020 | Kim | | G06F 3/0446 |
| 10,866,448 B2* | 12/2020 | Sun | | H01L 27/323 |
| 10,877,595 B2* | 12/2020 | Han | | G02F 1/13338 |
| 10,915,194 B2* | 2/2021 | Zhu | | G06F 3/047 |
| 10,929,634 B2* | 2/2021 | Jee | | G06K 9/0002 |
| 2012/0242585 A1 | 9/2012 | Jones | | G06F 3/0446 345/173 |
| 2014/0047706 A1* | 2/2014 | Shaikh | | G06F 3/0446 29/622 |
| 2014/0111474 A1* | 4/2014 | Bytheway | | G06F 3/0446 345/174 |
| 2015/0042615 A1* | 2/2015 | Yilmaz | | H05K 1/0296 345/174 |
| 2015/0355746 A1* | 12/2015 | Hoch | | G06F 3/044 345/174 |
| 2016/0224818 A1* | 8/2016 | Song | | G06K 9/0002 |
| 2016/0350570 A1* | 12/2016 | Han | | G06F 3/04164 |
| 2016/0364593 A1* | 12/2016 | Lee | | G06F 3/04164 |
| 2017/0147850 A1* | 5/2017 | Liu | | G06F 3/0412 |
| 2017/0193265 A1* | 7/2017 | Chan | | G06F 3/0446 |
| 2017/0293378 A1* | 10/2017 | Ahn | | G06F 3/0445 |
| 2017/0336909 A1* | 11/2017 | Song | | G06K 9/00013 |
| 2017/0336910 A1* | 11/2017 | Han | | G06F 3/0446 |
| 2017/0344148 A1* | 11/2017 | Han | | G06F 3/0443 |
| 2017/0344787 A1* | 11/2017 | Cho | | G06F 3/04166 |
| 2018/0039349 A1* | 2/2018 | Han | | G06F 3/04164 |
| 2018/0068156 A1* | 3/2018 | Jang | | G06K 9/0002 |
| 2018/0113346 A1* | 4/2018 | Han | | G02F 1/13338 |
| 2018/0113548 A1* | 4/2018 | Lee | | G06F 3/04164 |
| 2018/0113558 A1* | 4/2018 | Cho | | G06K 9/0002 |
| 2018/0181787 A1* | 6/2018 | Jee | | G06K 9/0002 |
| 2018/0335880 A1* | 11/2018 | Seol | | G06F 3/0488 |
| 2019/0018540 A1* | 1/2019 | Ko | | G06F 3/0445 |
| 2019/0114455 A1* | 4/2019 | Kim | | G06F 3/0416 |
| 2019/0286264 A1* | 9/2019 | Li | | G06K 9/0002 |
| 2019/0324576 A1* | 10/2019 | Ahn | | G06F 3/0445 |
| 2020/0034595 A1* | 1/2020 | Jang | | G06K 9/0002 |
| 2020/0050360 A1* | 2/2020 | Jeon | | G06K 9/209 |
| 2020/0310573 A1* | 10/2020 | Hsu | | G06K 9/0004 |
| 2020/0311367 A1* | 10/2020 | Hu | | G06F 3/0412 |
| 2020/0327294 A1* | 10/2020 | Cheng | | G09G 3/2003 |
| 2020/0327297 A1* | 10/2020 | An | | G06K 9/0004 |
| 2021/0109635 A1* | 4/2021 | An | | G06F 3/04166 |
| 2021/0216737 A1* | 7/2021 | Kim | | G06F 3/0446 |

FOREIGN PATENT DOCUMENTS

| | | |
|---|---|---|
| CN | 104252277 A | 12/2014 |
| CN | 105159506 A | 12/2015 |
| CN | 106354351 A | 1/2017 |
| CN | 106371654 A | 2/2017 |
| CN | 106383623 A | 2/2017 |
| CN | 106775129 A | 5/2017 |
| CN | 106802747 A | 6/2017 |
| CN | 107045403 A | 8/2017 |
| CN | 107272942 A | 10/2017 |
| CN | 107346195 A | 11/2017 |
| CN | 107402680 A | 11/2017 |
| CN | 108089756 A | 5/2018 |
| TW | 201643670 A | 12/2016 |

* cited by examiner

TOUCH PANELS AND DRIVING CONTROL METHODS THEREOF, TOUCH DISPLAY DEVICES

CROSS-REFERENCE TO RELATED APPLICATIONS

This is a continuation of International Application No. PCT/CN 2018/096964, filed on Jul. 25, 2018, which is based upon and claims priority to Chinese Patent Application No. 201711481123.1, filed on Dec. 29, 2017, the entire contents of which are incorporated herein by reference.

FIELD OF THE DISCLOSURE

The disclosure relates to touch technologies, and in particular, to touch panels and driving control methods thereof, and touch display devices.

BACKGROUND

With the development of touch technologies and display technologies, touch display devices have been increasingly sought after by people, which not only save space, being convenient to carry, but also allow users to directly operate using their fingers or stylus, comfortably and very conveniently. At present, touch display devices have been applied in various technical fields, such as personal digital processing (PDA), touch intelligent mobile terminals (such as mobile phones), portable notebook computers in the market, and the like.

Taking touch intelligent mobile terminals as an example, with the rapid development of intelligent mobile terminals, intelligent mobile terminals with ultra-high screen-to-body ratio are getting highly thought by more and more manufacturers and consumers by virtue of their ability to bring ultimate visual experience to users. However, as the screen-to-body ratio of the intelligent mobile terminals is increasing, an underside of the display screen of the intelligent mobile terminal leaves a smaller and smaller space of a fingerprint identification module for a user to perform a security authentication. In this case, in order to provide a more convenient using experience for a user, some manufacturers consider directly arranging the fingerprint identification module in a touch display area of an intelligent mobile terminal, so that the user may perform both a touch operation and a finger identification operation in the touch display area.

However, a touch film layer and a fingerprint identification film layer are currently separately wired, resulting in a large number of wirings and dense wiring in the fingerprint identification area, which easily blocks the light emitted from a touch panel.

SUMMARY

Exemplary embodiments of the disclosure provide touch panels and driving control methods thereof, touch display devices to solve above technical problems existed in the prior art.

To solve above technical problems, the following technical solutions are adopted in exemplary embodiments of the disclosure.

A touch panel comprises a first electrode, a second electrode, and a third electrode. The first electrode, the second electrode, and the third electrode are insulated from each other. The first electrode and the second electrode are crosswise arranged to form a touch film layer, and the second electrode and the third electrode are crosswise arranged to form a fingerprint identification film layer.

Optionally, the first electrode is a touch driving electrode, the third electrode is a fingerprint driving electrode, and the second electrode is a common inductive electrode of the touch film layer and the fingerprint identification film layer, or, the first electrode is a touch inductive electrode, the third electrode is a fingerprint inductive electrode, and the second electrode is a common driving electrode of the touch film layer and the fingerprint identification film layer.

Optionally, the fingerprint identification film layer is correspondingly arranged on a preset target area of the touch panel, and the preset target area is a specific partial area or an entire area of the touch panel.

Optionally, a line width of the second electrode corresponding to the preset target area is smaller than a first threshold, and/or a central spacing of adjacent second electrodes corresponding to the preset target area is less than a second threshold.

Optionally, a line width of the second electrode corresponding to the preset target area ranges from 3 μm to 5 μm, the central spacing of adjacent second electrodes corresponding to the preset target area ranges from 8 μm to 12 μm.

Optionally, the second electrode is arranged between a film layer in which the first electrode is located and a film layer in which the third electrode is located.

Optionally, the touch panel further comprises: a display film layer, being provided with a plurality of illuminating sub-pixels arranged in an array. An orthographic projection of an electrode pattern of the fingerprint identification layer on the touch film layer does not overlap an orthographic projection of the illuminating sub-pixels of the display film layer on the touch film layer.

Optionally, the second electrode corresponding to the preset target area has a hollow pattern.

A method of driving and controlling a touch panel, the touch panel comprising a first electrode, a second electrode, and a third electrode, and the first electrode, the second electrode, and the third electrode are insulated from each other, and the first electrode and the second electrode are crosswise arranged to form a touch film layer, and the second electrode and the third electrode are crosswise arranged to form a fingerprint identification film layer.

The method comprises:

in a touch mode, a plurality of first electrodes being loaded with first driving signals sequentially, a plurality of second electrodes being loaded with first inductive signals simultaneously;

when switching to a fingerprint identification mode, a plurality of third electrodes being loaded with second driving signals sequentially, and the plurality of second electrodes being loaded with second inductive signals simultaneously;

or, in a touch mode, a plurality of second electrodes being loaded with first driving signals sequentially, a plurality of first electrodes being loaded with first inductive signals simultaneously;

when switching to a fingerprint identification mode, the plurality of second electrodes being loaded with second driving signals sequentially, a plurality of third electrodes being loaded with second inductive signals simultaneously.

A touch display device, comprising a touch panel. The touch panel includes a first electrode, a second electrode, and a third electrode; and the first electrode, the second electrode, and the third electrode are insulated from each other, and the first electrode and the second electrode are crosswise arranged to form a touch film layer, and the second electrode and the third electrode are crosswise arranged to form a fingerprint identification film layer.

The following advantageous effects may be achieved by at least one of the above technical solutions adopted by exemplary embodiments of the disclosure:

A first electrode and a second electrode may form a touch film layer by a common second electrode, and the second electrode and a third electrode may also form a fingerprint identification film layer, thereby the wiring number and the wiring intensity on the touch panel may be reduced, and the blocking to the illuminating sub-pixels of the display film layer may be reduced. Moreover, the touch function and the fingerprint identification function can be respectively achieved by the second electrode on the touch panel, thereby improving the utilization ratio of the common electrode and simplifying the structural design.

DETAILED DESCRIPTION OF PREFERRED EMBODIMENTS

To make an objective, technical solutions and advantages of the disclosure clearer, technical solutions of the disclosure will be described clearly and fully in conjunction with specific embodiments and corresponding drawings below.

Technical solutions provided by exemplary embodiments of the disclosure is described in detail below in conjunction with accompanying drawings.

Figure 1:
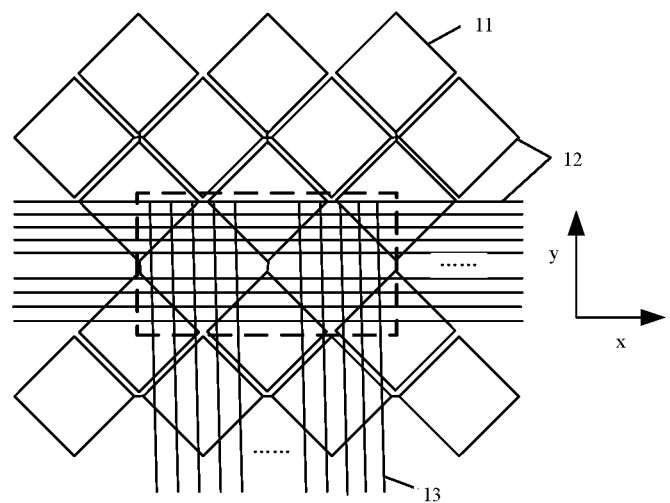
FIG. 1 is a schematic view of a touch panel provided by the disclosure.

Referring to FIG. 1, FIG. 1 is a schematic view of a touch panel provided by the disclosure, the touch panel includes a plurality of first electrodes 11 extending in a first direction (such as a lateral x direction in FIG. 1), a plurality of second electrodes 12 extending in a second direction (such as a longitudinal y direction in FIG. 1), and a plurality of third electrodes 13 extending in a third direction (such as a longitudinal y direction in FIG. 1). All of the first electrode 11, the second electrode 12, and the third electrode 13 are insulated from each other, and the first electrode 11 and the second electrode 12 are arranged crosswise to form a touch film layer, and the second electrode 12 and the third electrode 13 are arranged crosswise to form a fingerprint identification film layer.

The crossed angle between the first electrode 11 and the second electrode 12 is not limited, and the crossed angle between the second electrode 12 and the third electrode 13 is not limited. Then, the extending directions of the first electrode 11 and the third electrode 13 may be the same, or has a certain crossed angle.

Therefore, in the solution of the disclosure, by sharing a second electrode, a first electrode and the second electrode may form a touch film layer and the second electrode and a third electrode may also form a fingerprint identification film layer, thereby a wiring number and a wiring intensity on a touch panel may be reduced, and a blocking of illuminating sub-pixels of a display film layer may be reduced. Moreover, a touch function and a fingerprint identification function can respectively achieved by the second electrode on the touch panel, thereby improving an utilization ratio of the common electrode and simplifying a structural design.

Figure 2A:
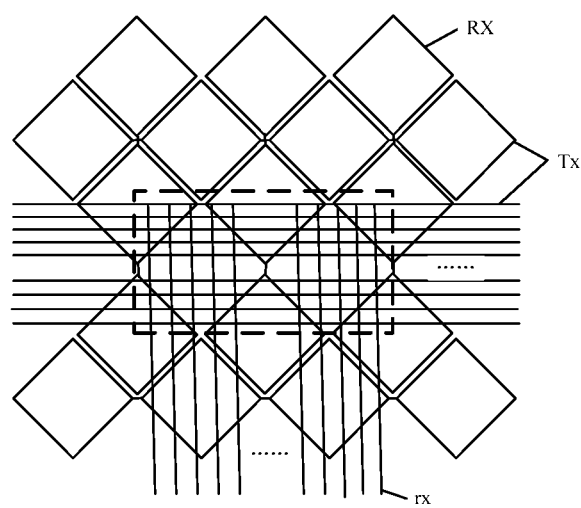
FIGS. 2(a) and 2(b) are respectively two schematic views of touch panels with common second electrodes involved in the disclosure.

In the disclosure, the second electrode is a common electrode, and in particular, at least the following structural design may exist:

Structure 1:

Referring to FIG. 2(a), a first electrode RX is a touch inductive electrode, a third electrode rx is a fingerprint inductive electrode, and a second electrode Tx is a common driving electrode of a touch film layer and a fingerprint identification film layer. Therefore, the structure 1 takes the second electrode as a common touch electrode to realize a touch function and a fingerprint identification function, thereby improving an utilization ratio of the common electrode, and simplifying a structural design.

Figure 2B:
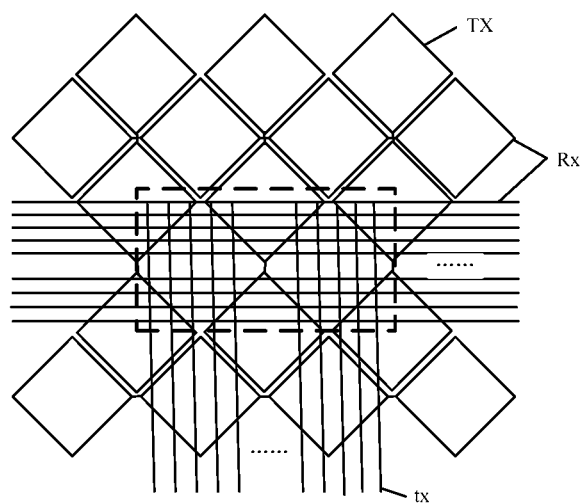

Structure 2:

Referring to FIG. 2(b), a first electrode TX is a touch driving electrode, a third electrode tx is a fingerprint driving electrode, and a second electrode Rx is a common inductive electrode of a touch film layer and a fingerprint identification film layer. Therefore, the structure 2 takes the second electrode as a common inductive electrode to realize a touch function and a fingerprint identification function, thereby improving a utilization ratio of the common electrode, and simplifying a structural design.

It should be noted that, in the disclosure, a fingerprint identification film layer is correspondingly arranged on a preset target area of a touch panel which is a specific partial area or an entire area of the touch panel. In other words, the fingerprint identification film layer may be distributed in a partial area of the touch panel, that is, a specific partial area, so that the fingerprint identification and touch may be achieved based on a common electrode, which is designed partly, simplifying the structure, or is distributed in the entire panel of the touch panel, thereby achieving the full-screen fingerprint identification.

Figure 3A:
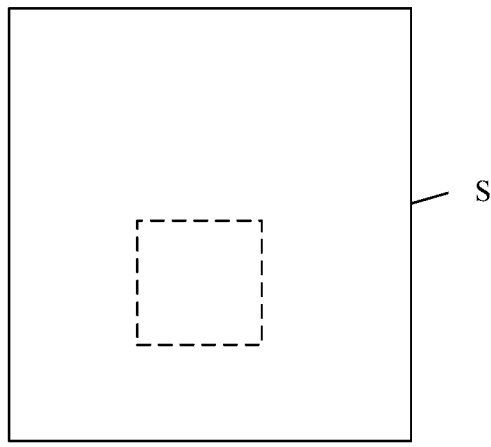
FIGS. 3(a) and 3(b) are schematic views of touch panels with fingerprint identification film layers provided by the disclosure.

Referring specifically to FIG. 3(a), a fingerprint identification film layer (a film layer formed by a second electrode and a third electrode being crosswise insulated from each other) is arranged correspondingly in a specific partial area of a touch panel S (the dotted line frame area in the drawing). A line width of a second electrode corresponding to the preset target area (i.e., the specific partial area) is smaller than a first threshold, and/or, a central spacing of adjacent second electrodes corresponding to the preset target area (i.e., the specific partial area) is smaller than a second threshold. The first threshold is a maximum line width that may be used for realizing fingerprint identification. If the line width is exceeded, the fingerprint may not be effectively identified. The second threshold is a maximum central distance that may be used for realizing fingerprint identification. If the central distance is exceeded, the fingerprint may not be effectively identified. For the second electrode of the preset target area, as long as one of the above two conditions is satisfied, or the above two conditions are both satisfied, the fingerprint may be effectively identified. For example, the line width of the second electrode corresponding to the preset target area ranges from 3 μm to 5 μm, and the central distance of the adjacent second electrode corresponding to the preset target area ranges from 8 μm to 12 μm. Line widths and central distances of second electrodes corresponding to an area outside the preset target area may be designed according to specifications of touch electrodes, as long as the touch function can be realized.

Figure 3B:
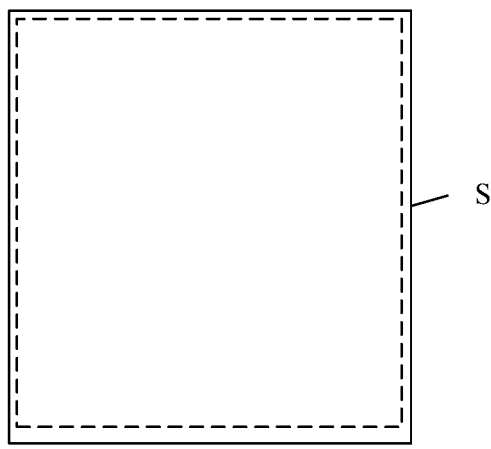

In addition, as shown in FIG. 3(b), a fingerprint identification film layer is arranged correspondingly in an entire panel of a touch panel S (the dotted frame area in the figure), so that line widths of all second electrodes are less than a first threshold. And/or, a central spacing of adjacent second electrodes corresponding to the preset target area is less than a second threshold.

Optionally, in the disclosure, a second electrode may be arranged on a surface of a first electrode (i.e., a surface of the first electrode far away from the third electrode), or arranged on a surface of the third electrode (i.e., a surface of the third electrode far away from the first electrode), or between the film layer where the first electrode is located and the film layer where the third electrode is located, which is not limited in the disclosure. When designing, considering that the second electrode is a common electrode, preferably, it is arranged between the film layer where the first electrode is located and the film layer where the third electrode is located.

Figure 4:
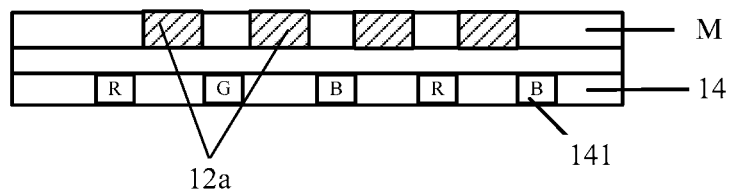
FIG. 4 is a schematic cross-sectional view of a touch panel provided by the disclosure.

Optionally, in the disclosure, as shown in FIG. 4, a touch panel further includes: a display film layer 14 provided with a plurality of illuminating sub-pixels 141 arranged in an array; a fingerprint identification layer, and an orthographic projection of an electrode pattern M (the third electrode 13 and the second electrode 12a corresponding to the preset target area) on the touch film layer in the fingerprint identification layer does not overlap an orthographic projection of the illuminating sub-pixels 141 on the touch film layer in the display film layer 14. Therefore, the illuminating sub-pixels in the display film layer are reasonably avoided, avoiding the fingerprint identification layer blocking the illuminating sub-pixels in the display film layer, thereby ensuring the illuminating efficiency of the touch panel.

Optionally, in the disclosure, the following case may also exist: an orthographic projection of the electrode pattern on the touch film layer in the fingerprint identification film layer and the orthographic projection of the illuminating sub-pixels on the touch film layer in the display film layer partly overlap with each other.

Optionally, in the disclosure, the second electrode corresponding to the preset target area has a hollow pattern. In a specific implementation, considering that the second electrode needs to be reasonably avoided from the illuminating sub-pixels of the display film layer, the orthographic projection of the second electrode is generally designed to be located at a gap of the illuminating sub-pixels. Especially for high-PPI touch panel, a pitch of the illuminating sub-pixels is respectively small, and gaps are respectively narrow. In order to ensure a sufficient capacitance of the fingerprint identification film layer, a second electrode may be designed at two gaps respectively, and the second electrode is divided into two thin lines. In a corresponding position where the illuminating sub-pixels is sandwiched by the two gaps, the second electrode is hollowed, so that the illuminating sub-pixels may be reasonably avoided, and sufficient capacitance may be ensured to realize fingerprint identification. Optionally, in the disclosure, the hollow structure is not limited to the above example, and a second electrode may be arranged at a plurality of gaps. At positions corresponding to illuminating sub-pixels between adjacent gaps, second electrodes are hollow.

In addition, it should be noted that, in the disclosure, a shape of the first electrode and patterns of second electrodes outside the preset target area are not limited, and may be a diamond or a strip electrode pattern.

In addition, the disclosure further provides a touch display device, comprising any one of the above touch panels. In addition, the touch display device may be any products or components with display functions, such as a mobile phone, a tablet computer, a television, a display, a notebook computer, a digital photo frame, a navigator, a smart wearable device, a VR, an AR, and the like. Other indispensable components of the display device are understood by those skilled in the art, and are not described herein, nor should they be construed as a limitation to the disclosure.

Optionally, in the disclosure, a method for driving and controlling the above touch panel is also provided. Considering the second electrode may be not only used as a common driving electrode, but also used as a common inductive electrode, accordingly, the following driving control methods may exist.

The second electrode is a common inductive electrode:

In a touch mode, the plurality of first electrodes extending in the first direction are sequentially loaded with first driving signals, and the plurality of second electrodes extending in the second direction are simultaneously loaded with first inductive signals;

When switching to a fingerprint identification mode, the plurality of third electrodes extending in the third direction are sequentially loaded with second driving signals, and the plurality of second electrodes extending in the second direction are simultaneously loaded with second inductive signals.

Figure 5A:
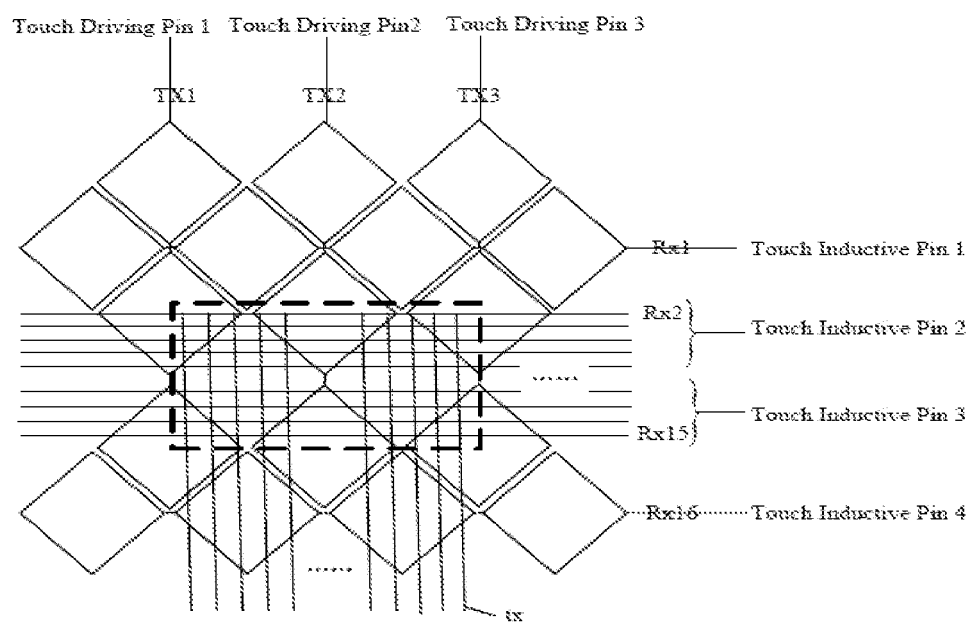
FIG. 5(a) and FIG. 5(b) are schematic views showing connection relationships of pins in a switching process between a touch function and a fingerprint identification function of a touch panel provided by the disclosure.

Specifically, each of the first electrodes extending in the first direction is sequentially scanned and driven, and the first driving signal used for touch is loaded during scanning. At the same time, each of the second electrodes extending in the second direction is loaded with the first inductive signal used for touch. The plurality of first electrodes are respectively connected to different pins. For example, as shown in FIG. 5(a), first electrodes are TX1 to TX3 respectively connected to touch driving pin 1 to touch driving pin 3. Optionally, the number of the first electrodes is more than three, and the disclosure is only an example. In a plurality of second electrodes Rx1 to Rxn, second electrodes Rx2 to Rx15 correspond to the preset area. A preset number of adjacent second electrodes are connected to a same pin. As shown in FIG. 5(a), a width of the second electrodes Rx2 to Rx15 is equivalent to a width of the second electrode outside the preset area (for example, Rx1). Then, the second electrodes Rx2 to Rx7 are connected to a same touch inductive pin 2, and the second electrodes Rx8 to Rx15 are connected to a same touch inductive pin 3. Second electrodes corresponding to areas outside the preset area are respectively connected to different pins, i.e., the second electrode Rx1 is connected to a touch inductive pin 1 and the second electrode Rx16 is connected to a touch inductive pin 4.

Figure 5B:
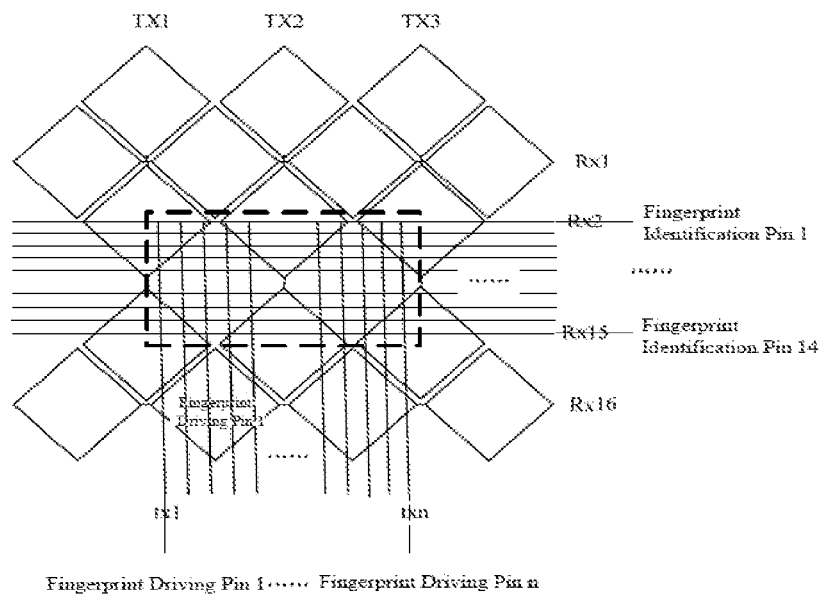

When switching to a fingerprint identification mode, each of the third electrodes extending in the third direction is sequentially scanned and driven, and second driving signals used for fingerprint identification are loaded during scanning, and at the same time, second electrodes located in the preset target area extending in the second direction are simultaneously loaded with second inductive signals for fingerprint identification. At this time, first driving signals loaded to first electrodes may be left unprocessed and the scanning state may be maintained. The signals loaded to second electrodes are switched, that is, pins, connected to second electrodes in the preset target area and used for touch, are switched to pins used for fingerprint identification. Specifically, referring to FIG. 5(b), second electrodes Rx2 to Rx7 being connected to the touch inductive pin 2 (shown in FIG. 5(a)) are switched to: the second electrodes Rx2-Rx7 being respectively connected to a fingerprint identification pin 1 to a fingerprint identification pin 6, and second electrodes Rx8 to Rx15 being connected to the touch inductive pin 3 (shown in FIG. 5(a)) are switched to: the second electrodes Rx8-Rx15 being respectively connected to a fingerprint identification pin 7 to a fingerprint identification pin 14. The plurality of third electrodes are respectively connected to different pins, that is, third electrodes are respectively tx1 to txn, which are respectively connected to a fingerprint driving pin 1 to a fingerprint driving pin n.

The second electrode is a common driving electrode:

In the touch mode, the plurality of second electrodes extending in the second direction are sequentially loaded with first driving signals, and the plurality of first electrodes extending in the first direction are simultaneously loaded with first inductive signals.

When switching to a fingerprint identification mode, a plurality of second electrodes extending in the second direction are sequentially loaded with second driving signals, and a plurality of third electrodes extending in the third direction are simultaneously loaded with second inductive signals.

Figure 6A:
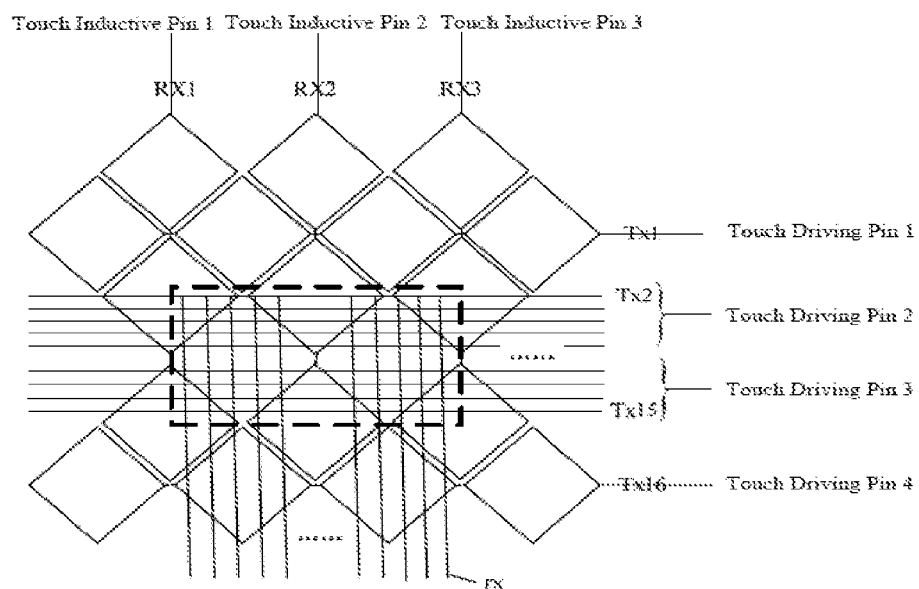
FIG. 6(a) and FIG. 6(b) are schematic views showing connection relationships of pins in a switching process between a touch function and a fingerprint identification function of a touch panel provided by the disclosure.

Specifically, each of the second electrodes extending in the second direction is sequentially scanned and driven, and first driving signals used for touch are loaded during scanning, and at the same time, the first electrodes extending in the first direction are loaded with first inductive signals used for touch simultaneously. In a plurality of second electrodes Tx1 to Txn, the second electrodes Tx2 to Tx15 correspond to the preset area, and adjacent second electrodes of the preset number are connected to the same pin. As shown in FIG. 6(a), a width of the second electrodes Tx2 to Tx7 is equivalent to a width occupied by a second electrode outside the preset area (for example, Tx1). Then the second electrodes Tx2 to Tx7 are connected to the same touch driving pin 2, and the second electrodes Tx8 to Tx15 are connected to the same touch driving pin 3. Second electrodes outside the corresponding preset area are respectively connected to different pins, that is, the second electrode Tx1 is connected to a touch driving pin 1, and the second electrode Tx16 is connected to a touch driving pin 4. A plurality of first electrodes RX1 to RX3 extending in the first direction are respectively led to a touch inductive pin 1 to a touch inductive pin 3.

Figure 6B:
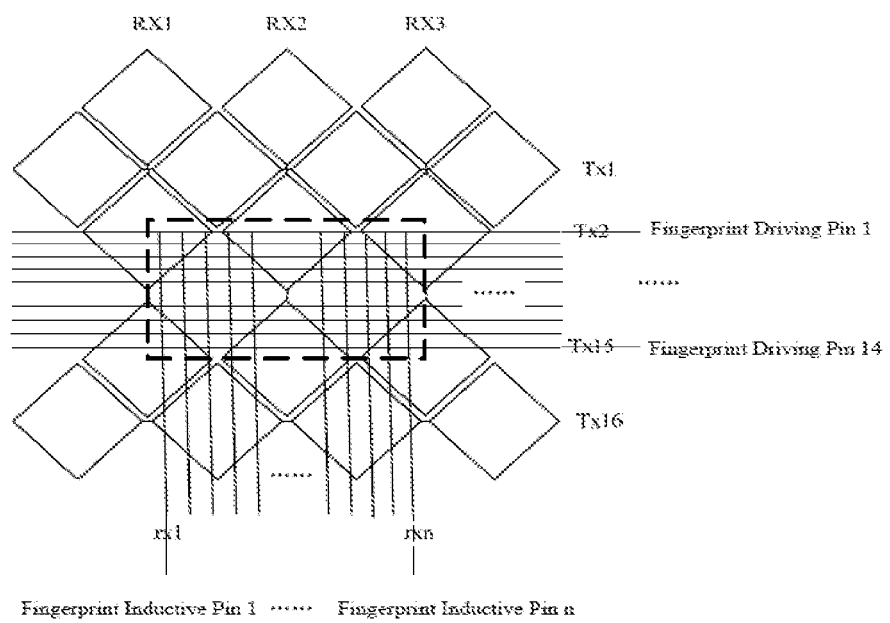

When switching to a fingerprint identification mode, each of the second electrodes extending in the second direction and located in the preset target area are sequentially scanned and driven, and second driving signals used for fingerprint identification are loaded during scanning, and at the same time, third electrodes extending in the third direction are loaded with second inductive signals used for fingerprint identification simultaneously. At this time, first inductive signals loaded to second electrodes may be left unprocessed and remain in an input state. While, signals loaded to second electrodes are switched, that is, pins for touch control connected to second electrodes corresponding to the preset target area are switched to pins for fingerprint identification. Specifically, as shown in FIG. 6(b), second electrodes Tx2 to Tx7 being connected to touch driving pins 2 (shown in FIG. 6(a)) are switched to: second electrodes Tx2 to Tx7 being respectively connected to a fingerprint driving pin 1 to a fingerprint driving pin 6, and second electrodes Tx8 to Tx15 being connected touch inductive pins 3 (shown in FIG. 6(a)) are switched to: second electrodes Tx7 to Tx15 being respectively connected to fingerprint driving pin 7 to fingerprint driving pin 14. A plurality of third electrodes are respectively connected to different pins, that is, third electrodes are respectively rx1 to rxn, which are respectively led to a fingerprint inductive pin 1 to a fingerprint inductive pin n.

It should be noted that, in the disclosure, switching of a fingerprint identification circuit and a touch control circuit mentioned above may be implemented by a driving IC, or may be implemented by a TFT switch, and is not limited thereto.

What is claimed is:

1. A touch panel, comprising:
a plurality of first electrodes, a plurality of second electrodes, and a plurality of third electrodes;
wherein the plurality of second electrodes comprise of a first portion and a second portion;
wherein the plurality of first electrodes, the plurality of second electrodes, and the plurality of third electrodes are insulated from each other, the plurality of first electrodes and the first portion of the plurality of second electrodes are crosswise arranged to form a touch film layer, and the second portion of the plurality of second electrodes and the plurality of third electrodes are crosswise arranged to form a fingerprint identification film layer;
wherein the plurality of first electrodes are touch driving electrodes and the plurality of third electrodes are fingerprint driving electrodes, and wherein the second portion of the plurality of second electrodes are common inductive electrodes of the touch film layer and the fingerprint identification film layer;
the touch panel further comprising: a display film layer provided with a plurality of illuminating sub-pixels arranged in an array; wherein an orthographic projection of an electrode pattern of the fingerprint identification layer on the touch film layer partly overlaps with an orthographic projection of the illuminating sub-pixels of the display film layer on the touch film layer;
wherein the plurality of second electrodes are arranged between a film layer in which the plurality of first electrodes are located and a film layer in which the plurality of third electrodes are located;
wherein the fingerprint identification film layer is correspondingly arranged in a preset target area of the touch panel;
wherein the preset target area is a partial area of the touch panel;
wherein the first portion of the plurality of second electrodes arranged between the film layer, in which the plurality of first electrodes are located, and the film layer, in which the plurality of third electrodes are located, have a hollow pattern in the preset target area;
wherein the first portion of the plurality of second electrodes arranged and the second portion of the plurality of second electrodes are separate and distinct from each other;
wherein each electrode in the first portion of the plurality of second electrodes are connected to a different touch pin;

wherein each electrode in the second portion of the plurality of second electrodes are connected to the same touch pin but different fingerprint identification pins; and wherein a width of the second portion of the plurality of second electrodes are substantially equivalent to a width of an electrode in the first portion of the plurality of second electrodes.

2. The touch panel according to claim 1, wherein a line width of each electrode in the second portion of the plurality of second electrodes corresponding to the preset target area are smaller than a first threshold, and a central spacing of adjacent electrodes in the second portion of the plurality of second electrodes corresponding to the preset target area are less than a second threshold.

3. The touch panel according to claim 2, wherein the line width of the each electrode in the second portion of the plurality of second electrodes corresponding to the preset target area ranges from 3 pm to 5 pm, and the central spacing of adjacent electrodes in the second portion of the plurality of second electrodes corresponding to the preset target area ranges from 8 pm to 12 pm.

4. The touch panel according to claim 1, wherein an orthographic projection of the second electrode is located at a gap of the illuminating sub-pixels.

5. The touch panel according to claim 1, wherein a second electrode is arranged at a plurality of gaps, the second electrodes having hollow defined at positions corresponding to illuminating the sub-pixels between the adjacent gaps.

6. The touch panel according to claim 1, wherein the touch pin is either a touch inductive pin or a touch driving pin.

7. A method of driving and controlling a touch panel, the touch panel comprising:
    a plurality of first electrodes, a plurality of second electrodes, and a plurality of third electrodes;
    wherein the plurality of second electrodes comprise of a first portion and a second portion;
    wherein the plurality of first electrodes, the plurality of second electrodes and the plurality of third electrodes are insulated from each other, the plurality of first electrodes and the first portion of the plurality of second electrodes are crosswise arranged to form a touch film layer, and the second portion of the plurality of second electrodes and the plurality of third electrodes are crosswise arranged to form a fingerprint identification film layer;
    wherein the plurality of first electrodes are touch driving electrodes and the plurality of third electrodes are fingerprint driving electrodes, and wherein the second portion of the plurality of second electrodes are common inductive electrodes of the touch film layer and the fingerprint identification film layer;
    the touch panel further comprising: a display film layer provided with a plurality of illuminating sub-pixels arranged in an array; wherein an orthographic projection of an electrode pattern of the fingerprint identification layer on the touch film layer partly overlaps with an orthographic projection of the illuminating sub-pixels of the display film layer on the touch film layer;
    wherein the plurality of second electrodes are arranged between a film layer in which the plurality of first electrodes are located and a film layer in which the plurality of third electrodes are located;
    wherein the fingerprint identification film layer is correspondingly arranged in a preset target area of the touch panel;
    wherein the preset target area is a partial area of the touch panel;
    wherein the first portion of the plurality of second electrodes arranged between the film layer, in which the plurality of first electrodes are located, and the film layer, in which the plurality of third electrodes are located, have a hollow pattern in the preset target area;
    wherein the first portion of the plurality of second electrodes arranged and the second portion of the plurality of second electrodes are separate and distinct from each other;
    wherein each electrode in the first portion of the plurality of second electrodes are connected to a different touch pin;
    wherein each electrode in the second portion of the plurality of second electrodes are connected to the same touch pin but different fingerprint identification pins; and
    wherein a width of the second portion of the plurality of second electrodes are substantially equivalent to a width of an electrode in the first portion of the plurality of second electrodes;
    the method comprising:
        in a touch mode, the plurality of first electrodes being loaded with first driving signals sequentially, the plurality of second electrodes being loaded with first inductive signals simultaneously; and
    when switching to a fingerprint identification mode, the plurality of third electrodes being loaded with second driving signals sequentially, and the second portion of the plurality of second electrodes being loaded with second inductive signals simultaneously.

8. A touch display device, comprising a touch panel, the touch panel including:
    a plurality of first electrodes, a plurality of second electrodes, and a plurality of third electrodes;
    wherein the plurality of second electrodes comprise of a first portion and a second portion;
    wherein the plurality of first electrodes, the plurality of second electrodes and the plurality of third electrodes are insulated from each other, the plurality of first electrodes and the first portion of the plurality of second electrodes are crosswise arranged to form a touch film layer, and the second portion of the plurality of second electrodes and the plurality of third electrodes are crosswise arranged to form a fingerprint identification film layer;
    wherein the plurality of first electrodes are touch driving electrodes and the plurality of third electrodes are fingerprint driving electrodes, and wherein the second portion of the plurality of second electrodes are common inductive electrodes of the touch film layer and the fingerprint identification film layer;
    the touch panel further comprising: a display film layer provided with a plurality of illuminating sub-pixels arranged in an array; wherein an orthographic projection of an electrode pattern of the fingerprint identification layer on the touch film layer partly overlaps with an orthographic projection of the illuminating sub-pixels of the display film layer on the touch film layer;
    wherein the plurality of second electrodes are arranged between a film layer in which the plurality of first electrodes are located and a film layer in which the plurality of third electrodes are located;
    wherein the fingerprint identification film layer is correspondingly arranged in a preset target area of the touch panel;

wherein the preset target area is a partial area of the touch panel;

wherein the first portion of the plurality of second electrodes arranged between the film layer, in which the plurality of first electrodes are located, and the film layer, in which the plurality of third electrodes are located, have a hollow pattern in the preset target area;

wherein the first portion of the plurality of second electrodes arranged and the second portion of the plurality of second electrodes are separate and distinct from each other;

wherein each electrode in the first portion of the plurality of second electrodes are connected to a different touch pin;

wherein each electrode in the second portion of the plurality of second electrodes are connected to the same touch pin but different fingerprint identification pins; and wherein a width of the second portion of the plurality of second electrodes are substantially equivalent to a width of an electrode in the first portion of the plurality of second electrodes.

9. The touch display device according to claim 8, wherein the touch pin is either a touch inductive pin or a touch driving pin.

* * * * *

UNITED STATES PATENT AND TRADEMARK OFFICE
CERTIFICATE OF CORRECTION

PATENT NO. : 11,270,094 B2
APPLICATION NO. : 16/913409
DATED : March 8, 2022
INVENTOR(S) : Lei An It is certified that error appears in the above-identified patent and that said Letters Patent is hereby corrected as shown below:

In the Claims

Column 9 Claim 3, Line 19:
"target area ranges from 3 pm to 5 pm, and the central spacing" should be replaced with --target area ranges from 3 µm to 5 µm, and the central spacing--

Column 9 Claim 3, Line 22:
"ranges from 8 pm to 12 pm" should be replaced with --ranges from 8 µm to 12 µm--

Signed and Sealed this
Thirty-first Day of May, 2022

*Katherine Kelly Vidal*

Katherine Kelly Vidal
*Director of the United States Patent and Trademark Office*